(12) United States Patent
Koifman

(10) Patent No.: US 7,969,476 B1
(45) Date of Patent: Jun. 28, 2011

(54) METHOD FOR ACCESSING A PIXEL AND A DEVICE HAVING PIXEL ACCESS CAPABILITIES

(75) Inventor: Vladimir Koifman, Rishon-Lezion (IL)

(73) Assignee: Advasense Technologies Ltd.

( * ) Notice: Subject to any disclaimer, the term of this patent is extended or adjusted under 35 U.S.C. 154(b) by 335 days.

(21) Appl. No.: 11/877,716

(22) Filed: Oct. 24, 2007

Related U.S. Application Data

(63) Continuation-in-part of application No. 11/752,973, filed on May 24, 2007, now Pat. No. 7,791,664.

(51) Int. Cl.
*H04N 5/235* (2006.01)
*H04N 5/335* (2006.01)
*H04N 5/228* (2006.01)
*H04N 3/14* (2006.01)

(52) U.S. Cl. .................................. 348/222.1; 348/294

(58) Field of Classification Search .................. 348/372, 348/308, 310, 302, 311, 306, 313, 301, 300, 348/294, 229.1, 230.1, 222.1, 241, 243, 250, 207.99

See application file for complete search history.

(56) References Cited

U.S. PATENT DOCUMENTS

| 5,929,434 A * | 7/1999 | Kozlowski et al. ....... 250/214 A |
| 6,784,931 B1 * | 8/2004 | Kudo ............................ 348/296 |
| 2004/0227831 A1 * | 11/2004 | Storm et al. .................. 348/294 |

\* cited by examiner

*Primary Examiner* — Nicholas G Giles
(74) *Attorney, Agent, or Firm* — Reches Patents

(57) ABSTRACT

A method for accessing a pixel, the method includes: providing a fixed reference current to a readout circuit that is coupled to a pixel, wherein the fixed reference current is indifferent to changes in a pixel output current drained by the pixel; wherein a value of the pixel output current is responsive to light impinging on the pixel during an integration period; and sampling a difference signal that is responsive to a different between the fixed reference current and the pixel output current while providing the fixed reference current to the readout circuit.

8 Claims, 5 Drawing Sheets

Providing a fixed reference current to a readout circuit that is connected to a pixel, wherein the fixed reference current is indifferent to changes in a pixel output current drained by the pixel; wherein a value of the pixel output current is responsive to light impinging on the pixel during an integration period. 310

Sampling a difference signal that is responsive to a difference between the fixed reference current and the pixel output current while providing the fixed reference current to the readout circuit. 330

Providing the fixed reference current to the readout circuit while providing a feedback signal to the pixel. 350

Writing, by a readout circuit, to a pixel while providing the fixed reference current to the readout circuit. 370

METHOD FOR ACCESSING A PIXEL AND A DEVICE HAVING PIXEL ACCESS CAPABILITIES

RELATED APPLICATIONS

This patent application is a continuation in part of U.S. patent application Ser. No. 11/752,973 titled "Methods for Reading a Pixel and for Writing to a Pixel and a Device Having Pixel Reading Capabilities and Pixel Writing Capabilities" filing date May 24, 2007.

FIELD OF THE INVENTION

The invention relates to methods for accessing a pixel and to devices having pixel access capabilities.

BACKGROUND OF THE INVENTION

Digital cameras include a two-dimensional pixel array. A single pixel can include one or more photo-detectors as well as multiple transistors. Typical photo-detectors include photodiodes, phototransistors, photo-gates, hole accumulation diodes, pinned diodes, avalanche diodes, buried accumulation and transfer layer devices.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, titled "CMOS active pixel reset noise reduction"; U.S. Pat. No. 6,762,401 of Lee, titled "CMOS image sensor capable of increasing fill factor and driving method thereof"; U.S. Pat. No. 6,567,495 of Harada titled "solid-state imaging device and a method of reading a signal charge in a solid-state imaging device which can reduce smear and can provide an excellent image characteristics"; U.S. Pat. No. 6,750,912 of Tennant et al., titled "Active-passive imager pixel array with small groups of pixels having short common bus lines"; U.S. Pat. No. 6,697,111 of Kozlowski et al., titled "compact low-noise active pixel sensor with progressive row reset"; U.S. Pat. No. 6,665,013 of Fossum et al., titled "active pixel sensor having intra-pixel charge transfer with analog-to-digital converter"; U.S. Pat. No. 6,587,142 of Kozlowski et al., titled "low-noise active-pixel sensor for imaging arrays with high speed row reset"; U.S. Pat. No. 6,538,245 of Kozlowski, titled "amplified CMOS transducer for single photon read-out of photodetectors"; U.S. Pat. No. 6,532,040 of Kozlowski et al., titled "low-noise active-pixel sensor for imaging arrays with high-speed row reset"; U.S. Pat. No. 5,892,540 of Kozlowski et al., titled "low noise amplifier for passive pixel CMOS imager"; U.S. Pat. No. 5,238,276 of Dhuse et al., titled "imaging system having a sensor array reset noise reduction mechanism" and U.S. Pat. No. 6,326,230 of Pain et al., titled "high speed CMOS imager with motion artifact suppression and anti-blooming".

Each pixel can be individually read by utilizing row select and column select circuits. Typically, a column readout circuit is allocated per pixel column. The readout circuit reads a pixel analog output signal that is responsive to noise and to the amount of light that impinged onto the pixel during an integration phase. Due to this dependency the power consumption of each readout pixel as well as the power consumption of the whole column readout is not stable.

The varying power consumption can cause varying IR drops and can affect the accuracy of analog to digital converters that are connected to the readout circuit.

There is a growing need to provide a device that is less affected by the amplitude of pixel output signals.

SUMMARY

A method for accessing a pixel, the method includes: (i) providing a fixed reference current to a readout circuit that is connected to a pixel, wherein the fixed reference current is indifferent to changes in a pixel output current drained by the pixel; wherein a value of the pixel output current is responsive to light impinging on the pixel during an integration period; and (ii) sampling a difference signal that is responsive to a different between the fixed reference current and the pixel output current while providing the fixed reference current to the readout circuit.

Conveniently, the method includes providing the fixed reference current to the readout circuit while providing a feedback signal to the pixel.

Conveniently, the method includes selecting a pixel out of a group of pixels to be connected to the readout circuit and providing the fixed reference current to the readout circuit regardless of an identity of the selected pixel.

Conveniently, the method includes writing, by a readout circuit, to a pixel while providing the fixed reference current to the readout circuit.

A device that includes: a stable reference source, a pixel and a readout circuit, the stable reference source provides a fixed reference current to the readout circuit, the readout circuit is connected to the pixel, wherein the stable reference source supplies the fixed reference current regardless of changes in a pixel output current drained by the pixel; wherein a value of the pixel output current is responsive to light impinging on the pixel during an integration period; and wherein the readout circuit received the fixed reference current and samples a difference signal that is responsive to a different between the fixed reference current and the pixel output current.

Conveniently, the readout circuit provides a feedback signal to the pixel while receiving the fixed reference current.

Conveniently, the device includes a selection circuitry that selects a pixel out of a group of pixels to be connected to the readout circuit and wherein the stable reference circuit provides the fixed reference current to the readout circuit regardless of an identity of the selected pixel.

Conveniently, the readout circuit is adapted to write to a pixel while receiving the fixed reference current.

BRIEF DESCRIPTION OF THE DRAWINGS

The present invention will be understood and appreciated more fully from the following detailed description taken in conjunction with the drawings in which:

FIG. 5 is a flow chart of a method for accessing a pixel, according to an embodiment of the invention.

DETAILED DESCRIPTION OF THE DRAWINGS

Power consumption is maintained constant by providing a readout circuit a fixed reference current, during different operational phase and regardless of pixel output currents.

Figure 1:
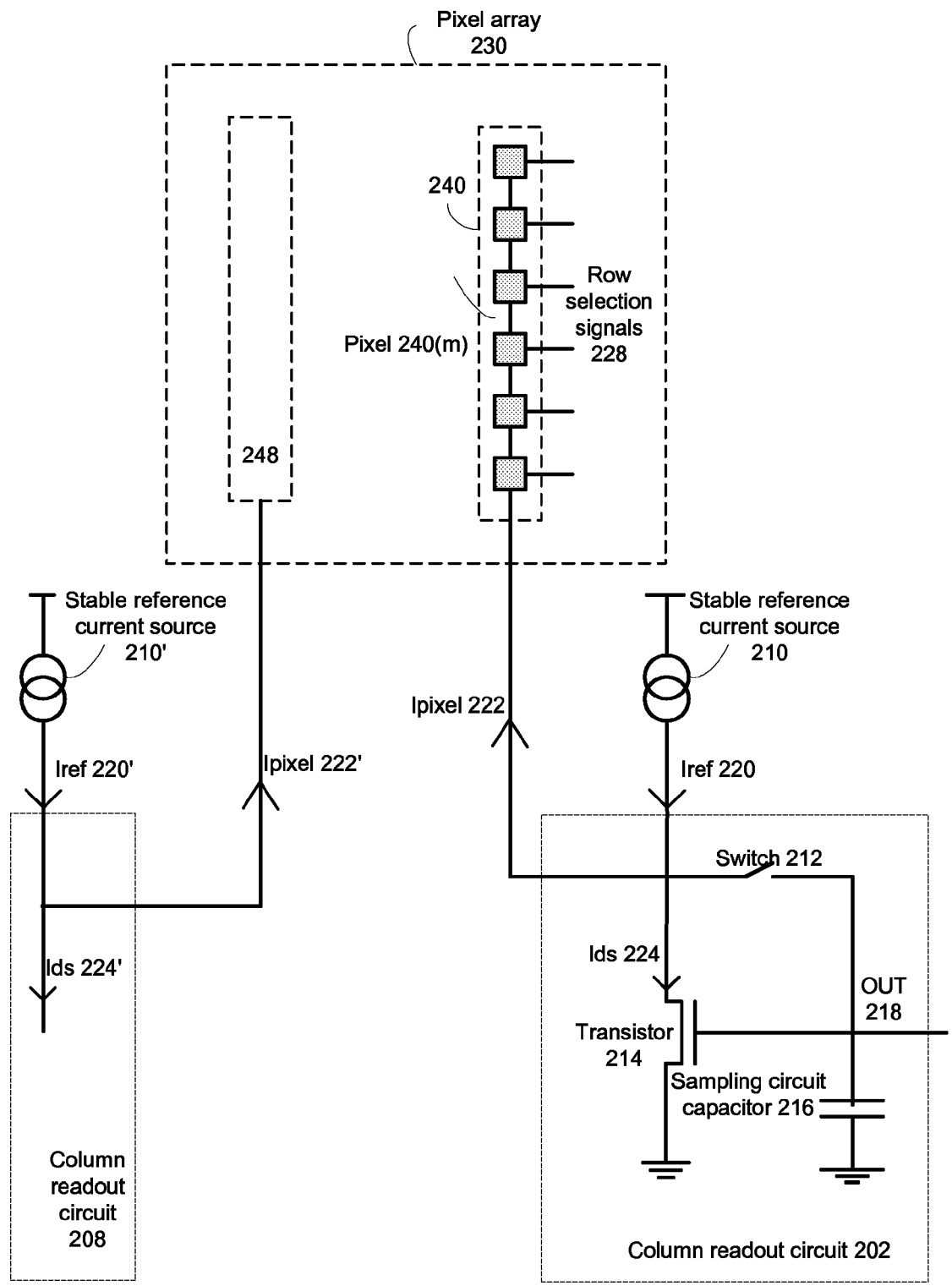
FIG. 1 illustrates a device according to various embodiments of the invention.
Figure 2:
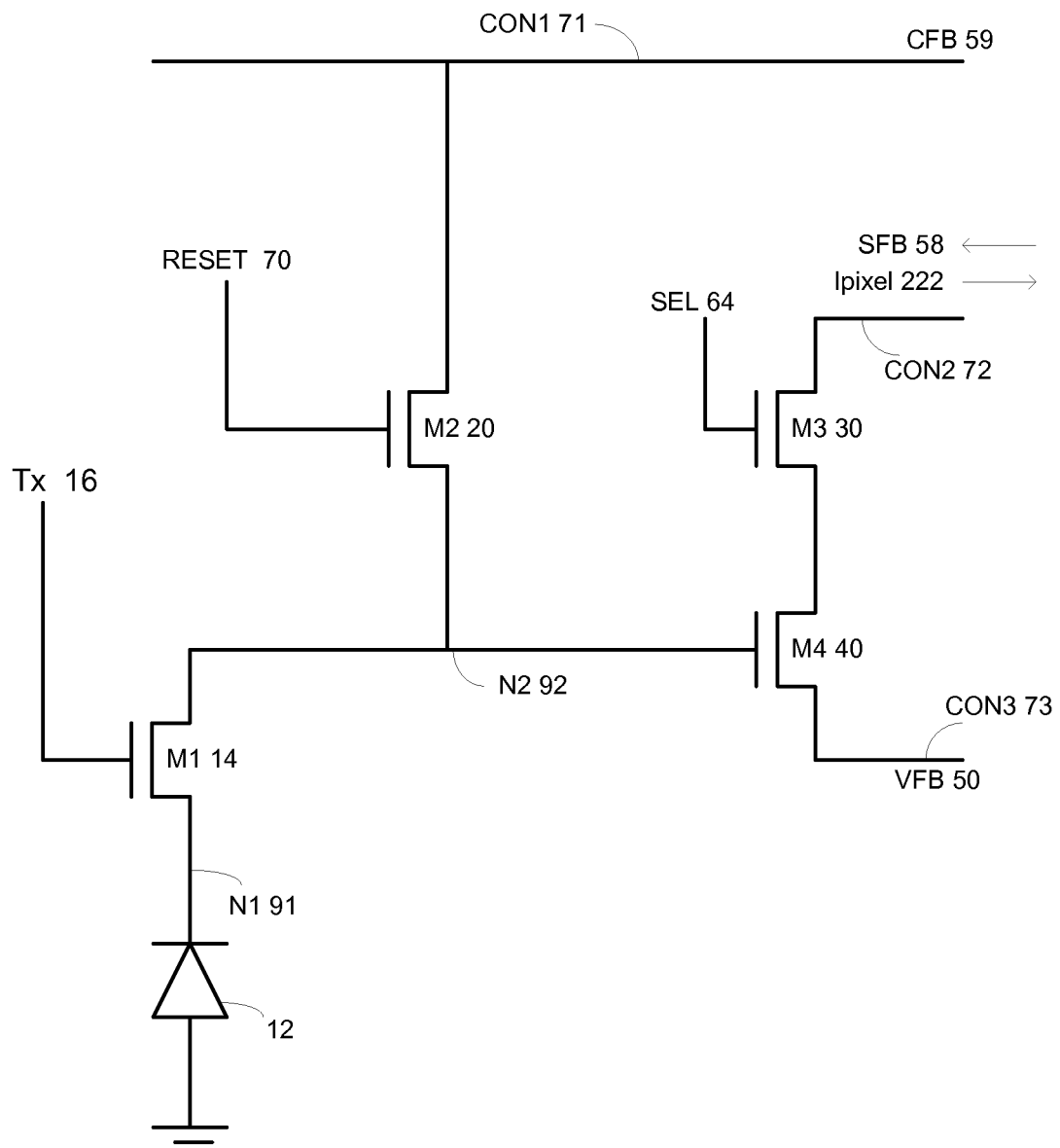
FIG. 2 illustrates a pixel according to an embodiment of the invention.
Figure 4:
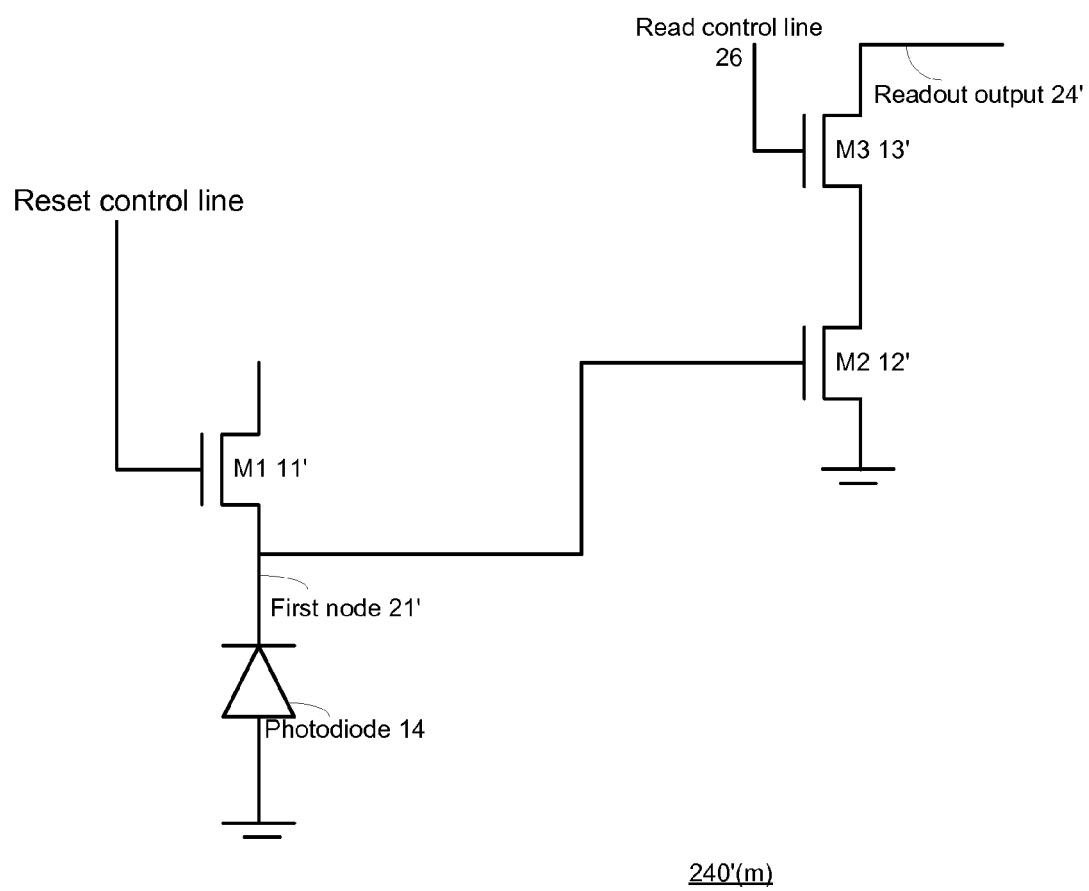
FIG. 4 illustrates a pixel.

For simplicity of explanation FIGS. 1, 2 and 4 illustrates NMOS transistors, although other types of transistors (PMOS, non-CMOS transistors) can be used.

FIG. 1 illustrates device 200 according to an embodiment of the invention.

Device 200 includes pixel array 230. Pixel array 230 typically includes a large number of pixels. Mega-pixel arrays include more than one thousand columns of more than a thousand columns each. Each column of pixels is connected to a column readout circuit. A column readout circuit is connected to a stable reference current source and can also be connected to an analog to digital converter.

For simplicity of explanation only two pixel columns (240 and 248) are shown. Only few pixels of pixel column 240 are shown. Two column readout circuits (202 and 208) and two stable reference current sources 210 and 210' are shown. It is assumed that row selection signals 228 activate pixel 240(m) and that this pixel can be read by column readout circuit 202 or can be written to by a column readout circuit. Column readout circuit 202 of FIG. 1 can read a pixel. More complex column readout circuits (such as but not limited to column readout circuit 202 of FIG. 3) can also write to a pixel, and additionally or alternatively, send a feedback signal to the pixel.

Column readout circuit 202 includes transistor 214, sampling circuit capacitor 216, switch 212 and output node OUT 218. The source of transistor 214 is grounded. The gate of transistor 214 is connected to output node OUT 218, to an end of sampling circuit capacitor 216 and to an end of switch 212. The other end of sampling circuit capacitor 216 is grounded. The other end of switch 212 is connected to the drain if transistor 214.

Switch 212 can be closed in order to enable transistor 214 to enter a state that is responsive to the pixel output current, and especially responsive to a difference signal (such as Ids 224) that is responsive to a different between the fixed reference current (Iref 220) and the pixel output current (Ipixel 222).

Once such a steady state is acquired switch 212 can be opened and sampling circuit capacitor 216 stores a sampled voltage that is responsive to the pixel output current.

The drain of transistor 214, stable reference current source 210, pixel column 240 and switch 212 are connected to input node N1 211. Fixed reference current Iref 220 (provided by stable reference current source 210) flows into input node N1 211. Pixel output current Ipixel 222, transistor drain source current Ids 224 and optionally (when switch 212 is closed) a switch current flows out of input node N1 211. According to Kirchoff's law Iref 220 equals the sum of Ipixel 222, Ids 224 and optionally the switch current.

Changes in the pixel output current are "compensated" by changes in the switch current and Ids 224.

The mentioned above configuration guarantees an aggregate stable power consumption of the pixel and readout circuit, regardless of changes in the pixel output current.

Stable reference current source 210 can be implemented using various prior art methods and circuits. For a non-limiting example it may include a saturated transistor, a feedback based current source, and the like.

Pixel 240(m) can include three or more transistors. It can be a prior art pixel, such as but not limited to pixel 240'(m) of FIG. 4 or a pixel that is connected to a feedback loop, as illustrated in PCT patent application serial number WO 2005/057903A2 titled "Apparatus and method for low noise sensing" which is incorporated herein by reference.

Pixel 240'(m) of FIG. 4 includes photodiode 14, first transistor M1 11', second transistor M2 12', and third transistor M3 13'.

First transistor M1 11' is conductive during a reset phase of pixel 240'(m) and is non-conductive during other operational phase of pixel 240'(m). The conductivity of first transistor M1 11' is controlled by a reset control signal provide to its gate.

The source of first transistor M1 11 is connected to photodiode 14 and to the gate of second transistor M2 12'. The source of second transistor M2 12' is grounded and the source of second transistor M2 12' is connected to the drain of third transistor M3 13'. The source of second transistor M2 12' is connected to readout output 24' of pixel 240'(m). The gate of third transistor M3 13' receives a read control signal (via a read control line 26) that opens third transistor M3 13' during a read phase.

FIG. 1 also illustrates column readout circuit 208. Column readout circuit 208 is equivalent to column readout circuit 202. It receives a pixel output current Ipixel 222' from a selected pixel of pixel column 208, and has a transistor (not shown) through which source drain current Ids 224' flows. It receives a fixed reference current Iref 220' from stable reference current source 210' and includes a switch (not shown) through which a switch current can flow (when the switch is closed).

The aggregate power consumption of the pixel and the column readout circuit 208 is set by the fixed reference current Iref 220'. Thus, it does not change, regardless of the pixel output current.

It is noted that device 200 can include a selection circuitry (such as but not limited to row selection circuit that generated row selection signals 228) that selects a pixel out of a group of pixels to be connected to the readout circuit and that the stable reference circuit provides the fixed reference current to the readout circuit regardless an identity of the selected pixel.

Referring to FIG. 1, column readout circuit 202 is connected to pixel column 240 and is especially connected to an activated pixel out of pixel column 240 during a readout phase. The stable reference current supply 210 provides the same fixed reference current regardless of the pixel (out of pixel column 240) that is activated by row selection signals 228.

FIG. 2 illustrates pixel 240(m) according to an embodiment of the invention.

Pixel 240(m) includes photo-detector 12, input transistor 14, second transistor 20, third transistor 30 and fourth transistor 40.

Conveniently, pixel 240(m) receives various control signals (such as RESET 70, SEL 64 and Tx 16) from a control circuit (not shown). It is also connected to three conductors. At least two of these conductors are also connected to a readout circuit such as column readout circuit 202 of FIG. 3.

First conductor (denoted CON1) 71 is connected to the drain of second transistor M2 20. It can convey a feedback signal such as current feedback signal CFB 58.

A pixel output signal (such as Ipixel 222) can be outputted from the drain of third transistor M3 30 to second conductor (denoted CON2 72). It is noted that second conductor 72 can be used to provide a feedback signal (denoted SFB 58) to the pixel.

Third conductor (denoted CON3) 73 is connected to the source of fourth transistor M4 40. It can convey a feedback signal such as voltage feedback signal VFB 50.

The source of input transistor M1 14 is connected to photo-detector 12 at first node N1 91. The gate of input transistor M1 14 receives row selection signal Tx 16. The drain of input transistor M1 14 is connected to second node N2 92. Second node N2 92 is also referred to as Floating Diffusion (FD) node 92.

The source of second transistor M2 20 is connected to second node N2 92. The gate of second transistor M2 20 receives reset signal RESET 70.

The source of third transistor M3 30 receives VFB 58. The gate of third transistor M3 30 is connected to second node N2 92. The drain of third transistor M3 30 is connected to the source of fourth transistor 40. The source of fourth transistor M4 40 is connected to the drain of third transistor M3 30. The gate of fourth transistor M4 40 receives column select signal SEL 64.

Input transistor M1 14 is also referred to as signal transfer transistor or transfer gate transistor. Second transistor M2 20 is also referred to as reset transistor. Third transistor M3 30 is also referred to as sense transistor.

Pixel 240(m) can be read or set to a certain value (reset value or a write-back value) by utilizing one or more capacitances that affect the second node voltage level. This is done without directly providing a signal to second node N2 92. Additionally or alternatively, a charge generated on photo-detector can be evaluated in response to pixel output signal measurements and in response to multiple capacitances that can affect the charge distribution between second node N2 92 and first node N1 91.

It is noted that other pixel configurations are illustrated in U.S. patent application Ser. No. 11/752,973 titled "Methods for Reading a Pixel and for Writing to a Pixel and a Device Having Pixel Reading Capabilities and Pixel Writing Capabilities" and U.S. provisional patent 60/807,848 titled "A Sensor and a Method for Utilizing a Sensor" that are incorporated herein by reference.

Figure 3:
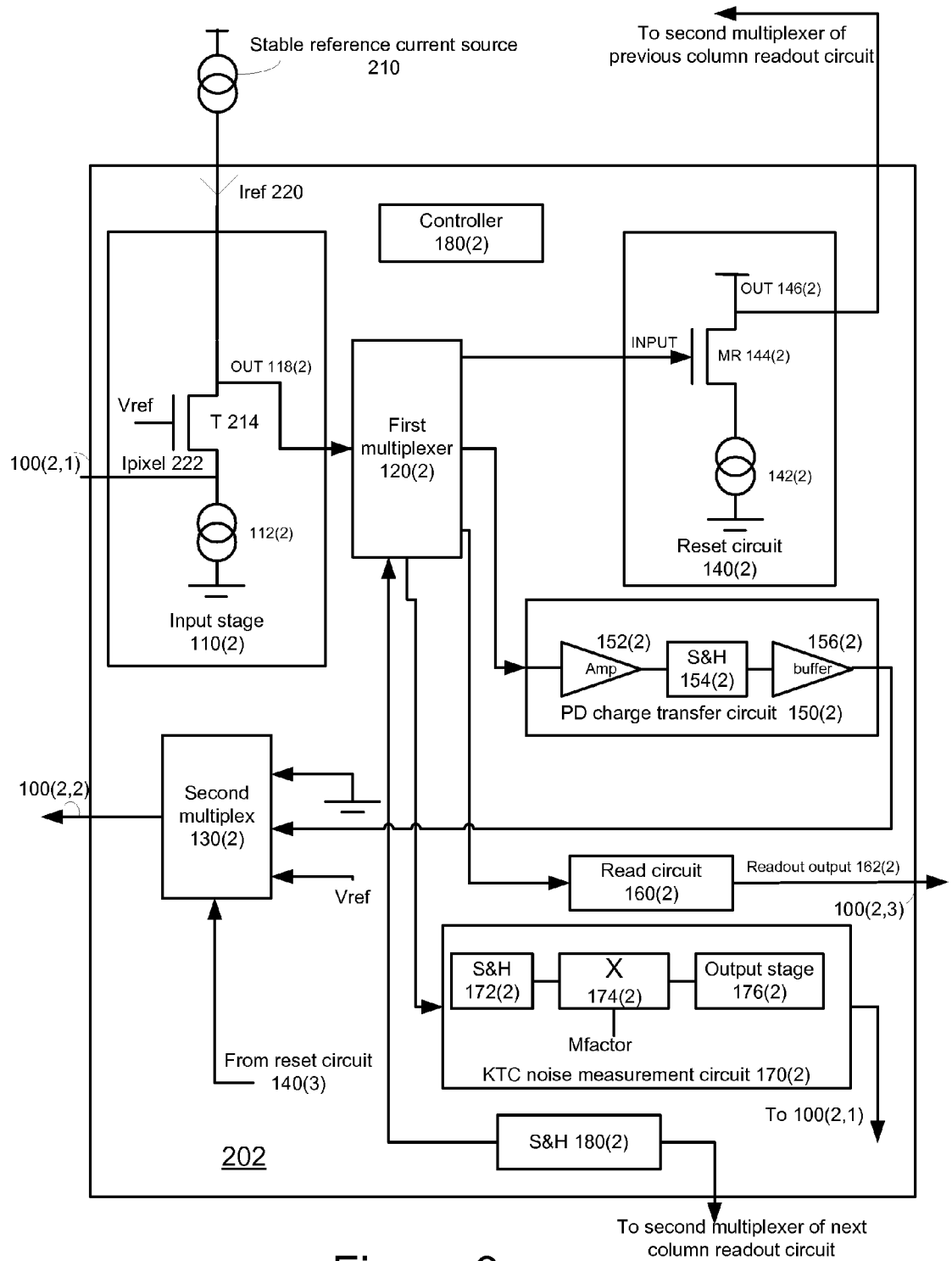
FIG. 3 illustrates a column readout circuit and a stable current reference source, according to an embodiment of the invention.

FIG. 3 illustrates column readout circuit 202 and stable current reference source 210, according to an embodiment of the invention.

Column readout circuit 202 includes input stage 110(2), first multiplexer 120(2), second multiplexer 130(2), reset circuit 140(2), photo-detector (PD) charge transfer circuit 150(2), read circuit 160(2), KTC noise measurement circuit 170(2) and sample and hold circuit 180(2).

Input stage 110(2) is connected to an input of first multiplexer 120(2) and receives a fixed reference current (Iref 220) from stable current reference source 210. Different outputs of first multiplexer 120(2) are connected to reset circuit 140(2), photo-detector (PD) charge transfer circuit 150(2), read circuit 160(2), KTC noise measurement circuit 156(2) and a sample and hold circuit 180(2). The output of sample and hold circuit 180(2) is connected to an input of a second multiplexer of the next column readout circuit.

Column readout circuit 202 includes three nodes—100(2,1), 100(2,2) and 100(2,3) that are connected to circuits outside readout circuit 100. Column readout circuit 202 is also connected to a previous column readout circuit and to a next column readout circuit. The previous column readout circuit is connected to a pixel column that precedes pixel column 240 while the next column readout circuit is connected to a pixel column that follows pixel column 240.

First node 100(2,1) is connected to a second conductor (such as second conductor 72) that may convey a pixel output signal (Ipixel 222) and also convey a feedback signal such as SFB.

Second node 100(2,2) is connected to a third conductor (such as third conductor 73) that may convey a feedback signal such as VFB to shared pixels of pixel column 240 and may convey a feedback signal such as CFB to shared pixels that belong to a pixel column that follows pixel column 240.

The output of KTC noise measurement circuit 170(2) is connected to the input of input stage 110(2). Additionally or alternatively the output signal of KTC noise measurement circuit 170(2) can be added to the output signal of input stage 110(2) and the summed signal is provided to the input of multiplexer 120(2).

The output of reset circuit 140(2) is connected to an input of a second multiplexer of a previous column readout circuit. The output of PD charge transfer circuit 150(2) is connected to an input of second multiplexer 130(2).

Input stage 110(2) as well as circuits 120(2)-170(2) can receive timing and control signals. These timing and control signals are not illustrated, for simplicity of explanation. The source of the timing and control signals is represented by controller 180(2).

Different inputs of second multiplexer 130(2) are connected to the ground, to a reference voltage (Vref), to an output of PD charge transfer circuit 150(2) and to an output of reset circuit of the next column readout circuit. Vref can be high (even substantially equal to a supply voltage).

Typically, when pixel 240(m) is read, it drains current (Ipixel flows into third transistor M3 30) from node 100(2,1) of column readout circuit 202 but sends substantially the same current through the source of fourth transistor M4 40 and via node 100(2,2) of column readout circuit 202. Accordingly, the power consumption of the readout circuit is not affected by the value of Ipixel as substantially the same current is drained and provided to the readout circuit. In other words, the stable reference current that is provided to column readout circuit 202 is also flows to the ground (or a negative power supply that is commonly referred to in the art as Vss), thus resulting in a constant power consumption.

FIG. 3 illustrates exemplary configurations of input stage 110(2), reset circuit 140(2) and PD charge transfer circuit 150(2).

Input stage 110(2) can receive, via first node 110(2,1) pixel output signal Ipixel 222 from an activated pixel (for example pixel 240(m)) of pixel column 240.

Input stage 110(2) operates as a buffer and provides a low impedance input. It includes transistor 214 and a switched current source 112(2). The switched current source is connected to the source of transistor 214 and is activated when input stage 110(2) is not connected to any active pixel. Switched current source 112(2) is optional.

The gate of input transistor 214 is connected to a reference voltage Vref. The drain of input transistor 214 is connected to stable reference current source 210. The source of input transistor 214 is connected to first node 110(2,1) and to switched current source 112(2).

The input of first multiplexer 120(2) is connected to output node 118(2) of input stage 110(2). Output node 118(2) is also connected to stable reference current source 210 and to the drain of transistor 214. It is noted that input stage 110(2) can be bypassed.

Reset circuit 140(2) provides low impedance output for fast settling (fast writing process). This reset circuit can be omitted, if a fast reset process is not required.

Reset circuit 140(2) includes transistor MR 144(2) and current source 142(2). The gate of transistor MR 144(2) is connected to an output of first multiplexer 140(2). The drain of transistor MR 144(2) is connected (at an output node 146(2) of reset circuit 140(2)) to a supply voltage. The source of transistor MR 144(2) is connected to current source 142(2).

PD charge transfer circuit 150(2) is able to sample a signal that represents the pixel output signal, store that sampled signal and then (at the appropriate timing) output a voltage feedback signal such as VFB 50. It conveniently includes amplifier 152(2), sample and hold circuit 154(2) and an output buffer 156(2), connected in a sequential manner.

Read circuit 160(2) can include one or more sample and hold circuits. It can sample a signal representative of a pixel output signal and generate an output signal (also termed readout output 162(2)) that is sent via node 100(2,4) of column readout circuit 202.

It is noted that column readout circuit 202 can receive the fixed reference current while writing to pixel 240(m), providing feedback signals such as SFB 58, VFB 50 and the like.

FIG. 5 is a flow chart of method 300 for accessing a pixel, according to an embodiment of the invention.

Method 300 starts by stage 310 of providing a fixed reference current to a readout circuit that is connected to a pixel, wherein the fixed reference current is indifferent to changes in a pixel output current drained by the pixel; wherein a value of the pixel output current is responsive to light impinging on the pixel during an integration period.

Stage 310 can be followed by either one of stage 330, 350 and 370. The fixed reference current is provided during stages 330, 350 and 370.

Stage 330 includes sampling a difference signal that is responsive to a different between the fixed reference current and the pixel output current.

Stage 350 includes providing the fixed reference current to the readout circuit while providing a feedback signal to the pixel Stage 330 may include selecting a pixel out of a group of pixels to be connected to the readout circuit.

Stage 370 includes writing, by a readout circuit, to a pixel while providing the fixed reference current to the readout circuit Conveniently, the stages of method 300 are executed by a device such as device 200 of FIG. 1. The pixel that provides (or rather drains) the pixel output signal can be the pixel of FIG. 2 or the pixel of FIG. 4. It is noted that other pixels can be accessed without departing from the spirit of the invention. It is further noted that the pixel can be accessed by a pixel readout circuit such as pixel readout circuit 202 of FIG. 1 or of FIG. 3 or by another readout circuit.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for accessing a pixel, the method comprising: providing a fixed reference current to a readout circuit that is coupled to a pixel, wherein the fixed reference current is indifferent to changes in a pixel output current drained by the pixel; wherein a value of the pixel output current is responsive to light impinging on the pixel during an integration period; and sampling a difference signal that is responsive to a difference between the fixed reference current and the pixel output current while providing the fixed reference current to the readout circuit; wherein the providing of the fixed reference current maintains a stable aggregate power consumption of the pixel and the readout circuit regardless of changes in pixel output current.

2. The method according to claim 1 wherein the method comprises providing the fixed reference current to the readout circuit while providing a feedback signal to the pixel.

3. The method according to claim 1 wherein the method comprises selecting a pixel out of a group of pixels to be connected to the readout circuit and providing the fixed reference current to the readout circuit regardless of an identity of the selected pixel.

4. The method according to claim 1 wherein the method comprises writing, by a readout circuit, to a pixel while providing the fixed reference current to the readout circuit.

5. A device that comprises: a stable reference source, a pixel and a readout circuit, the stable reference source provides a fixed reference current to the readout circuit, the readout circuit is coupled to the pixel, wherein the stable reference source supplies the fixed reference current regardless of changes in a pixel output current drained by the pixel; wherein the provision of the fixed reference current maintains a stable aggregate power consumption of the pixel and the readout circuit regardless of changes in pixel output current;
    wherein a value of the pixel output current is responsive to light impinging on the pixel during an integration period; and wherein the readout circuit receives the fixed reference current and samples a difference signal that is responsive to a difference between the fixed reference current and the pixel output current.

6. The device according to claim 5 wherein the readout circuit provides a feedback signal to the pixel while receiving the fixed reference current.

7. The device according to claim 5 wherein the device comprises a selection circuitry that selects a pixel out of a group of pixels to be connected to the readout circuit and wherein the stable reference circuit provides the fixed reference current to the readout circuit regardless of an identity of the selected pixel.

8. The device according to claim 5 wherein the device is adapted to write to a pixel while receiving the fixed reference current.

* * * * *